C. W. MARTIN.
AUTOMATIC MATCH BOX.
APPLICATION FILED DEC. 2, 1909.

969,384.

Patented Sept. 6, 1910.

Witnesses

Inventor
Clare W. Martin.
By E. E. Vrooman,
his Attorney.

UNITED STATES PATENT OFFICE.

CLARE W. MARTIN, OF POST FALLS, IDAHO.

AUTOMATIC MATCH-BOX.

969,384.  Specification of Letters Patent.  Patented Sept. 6, 1910.

Application filed December 2, 1909. Serial No. 530,966.

*To all whom it may concern:*

Be it known that I, CLARE W. MARTIN, a citizen of the United States of America, residing at Post Falls, in the county of Kootenai and State of Idaho, have invented certain new and useful Improvements in Automatic Match-Boxes, of which the following is a specification, reference being had therein to the accompanying drawing.

This invention relates to match receptacles, and the principal object of the same is to provide means whereby when the delivery lid or cover of the receptacle is opened, a match will be partly ejected so that it may be readily removed.

In carrying out the objects of the invention generally stated above it will be understood, of course, that the essential features thereof are necessarily susceptible of changes in details and structural arrangements, one preferred and practical embodiment of which is shown in the accompanying drawings, wherein—

Figure 1:
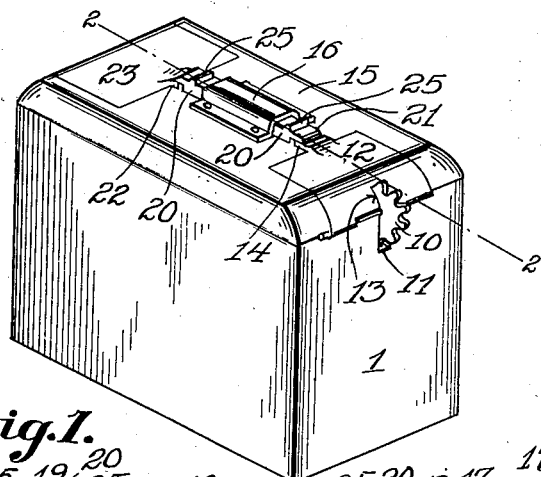
Figures 2, 3:
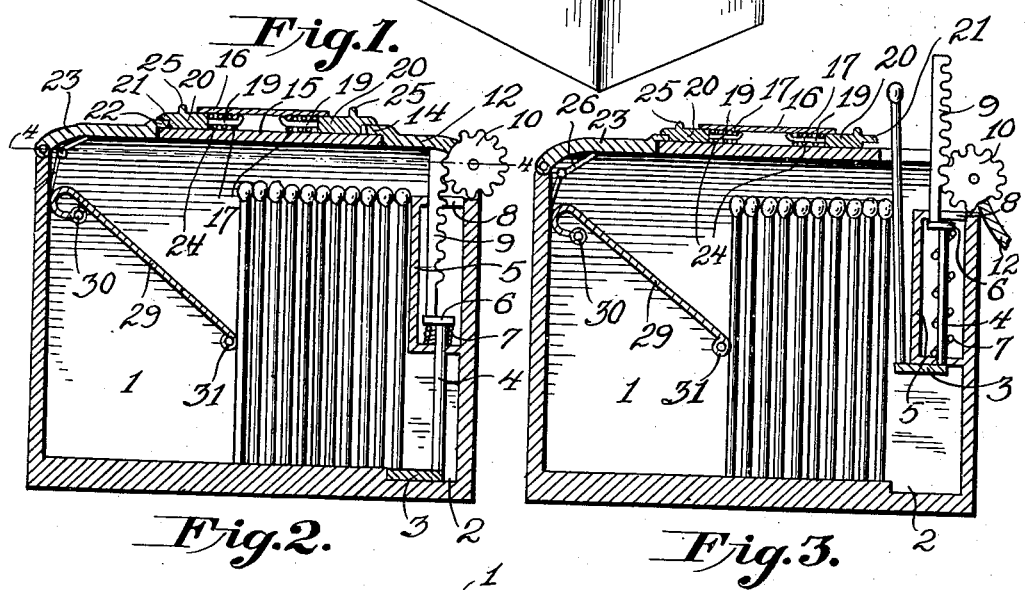
Figure 4:
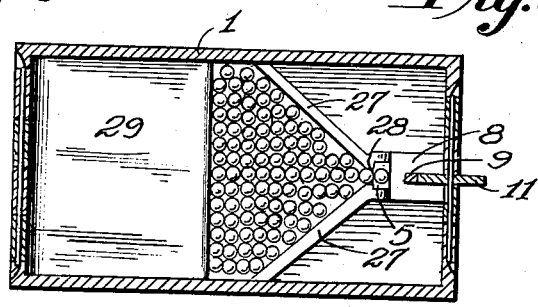

Figure 1 is a perspective view of the improved match receptacle. Fig. 2 is a vertical longitudinal sectional view taken on the line 2—2, Fig. 1, the match receptacle being closed. Fig. 3 is a view similar to Fig. 2, but showing a match partly ejected from the receptacle. Fig. 4 is a horizontal sectional view taken on the line 4—4, Fig. 2.

Referring to said drawings by numerals, 1 designates a receptacle, one inner end of the bottom of which is recessed as indicated at 2 forming a seat for an ejector 3 which carries a rod 4 that extends into a guideway 5. Said rod 4 has a wide flat head 6 which forms an abutment for one end of a spring 7 coiled about said rod, the other end of said spring bearing against the bottom of said guideway. The top of the guideway is provided with a slot 8 through which a rack 9 projecting from the head 6 is slidable. A pinion 10 is journaled in a slot 11 of the upper edge of the end of the receptacle 1, said pinion projecting into the receptacle and engaging the rack 9, and also projecting on the outside of the receptacle so that it may be operated to depress the rack 9 and rod 4 against the pressure of the spring 7.

A lid or cover 12 is hinged to the end of the receptacle adjacent the pinion 10 and is provided with a slot 13 through which said pinion projects. When the lid 12 is closed, the teeth of said pinion are engaged by the inner end of said slot so that when the lid is being rocked to an open position, pinion 10 will be rotated in a direction to cause rack 9 to elevate the ejecting mechanism, and when said lid is being rocked to a closed position, the pinion will cause rack 9 to depress the ejecting mechanism. The cover 12 is provided with a lip 14 which overlaps one edge of the top 15 of the receptacle when said lid is closed.

A housing 16 is arranged on the top 15 of the receptacle 1, said housing having its ends open. The housing 16 is provided with two spaced apart abutments 17—17 which serve as guides for the guide rods 19 of the latches 20, each of said latches having its outer end provided with a lip 21 for engagement with the lip 14 of the cover 12, and also for a similar lip 22 of a cover 23 hinged to the opposite end of the receptacle 1.

A spring 24 is coiled about each guide rod 19, the spring being interposed between the ends of their respective latches and the abutments 17 and exert a pressure to force the latches to a cover engaging position. A finger grip 25 is provided on each latch by means of which the latches may be retracted against the tension of their springs. The covers or lids 12—23, are each provided with a spring 26 (but one shown) which automatically throws the same to an open position when their latches are released.

The receptacle is provided with two vertical partitions 27 arranged in V-shape to provide a guideway having a contracted outlet 28 through which but one match at a time may pass. A spring 29, preferably a flat leaf spring, has one end mounted upon a rod or bar 30 extending across the upper portion of the rear of the receptacle, said spring being arranged at a downward inclination and having its free end 31 projecting across the inlet end of the V-shaped guideway and bearing against the matches to crowd them toward the outlet 28 so that when the ejector 3 is in its seat, as shown in Fig. 2, a match will be forced thereon.

The receptacle is filled through the opening closed by the cover 23, the presser spring 29 being forced down manually and the matches placed in the V-shaped guideway.

It will be understood that the ejector 3 is retained to its seat in the bottom of the receptacle when the cover 12 is closed, said cover bearing on the upper end of the rack 9 and thereby holding the same, as well as the guide rod, depressed against the tension of the spring 7. When the said cover is opened by releasing its latch, the spring 7 will automatically raise the rod and rack and the ejector 3, causing a match to be partly ejected through the receptacle, as shown in Fig. 3.

As will be observed by reference to Fig. 3, the match ejector 3 is limited in its upward movement by the bottom of the guideway 5, and also that said ejector projects outward beyond the vertical plane of the guideway so that the match being delivered is not brought in contact therewith. And it will also be observed that the projected portion of the ejector 3 prevents matches being forced to the seat 2 when said ejector is in a match delivering position.

What I claim as my invention is:—

1. A device of the character described comprising a receptacle, a lid for one end thereof, ejecting-mechanism in said receptacle for delivering an article from said receptacle when said lid is opened, a rack carried by said ejecting-mechanism which projects beyond the receptacle when an article is being delivered, and a pinion operated by said lid and engaging said rack to restore the ejecting-mechanism to an article-receiving position.

2. A device of the character described comprising a match receptacle, a pinion projecting through the upper edge of one end thereof, a lid for the receptacle provided with a clearance slot for said pinion, a match ejector slidable in said receptacle, a rack for said ejector held in mesh with said pinion and adapted to be actuated by said pinion to restore the said ejector to a match receiving position, said rack being engaged by said lid when closed to hold the ejector in a match receiving position, means for feeding matches to said ejector, and means for automatically actuating said ejector to cause the same to deliver a match when the lid or cover is being opened.

In testimony whereof I hereunto affix my signature in presence of two witnesses.

CLARE W. MARTIN.

Witnesses:
FRED MARTIN,
ROY BROADHEAD.